United States Patent

Cartwright et al.

[15] 3,648,325
[45] Mar. 14, 1972

[54] DOUBLE WHEELED CASTER

[72] Inventors: Robert S. Cartwright, Booneville; Charles N. Stewart, Winston-Salem, both of S.C.

[73] Assignee: Stewart-Warner Corporation, Chicago, Ill.

[22] Filed: Aug. 24, 1970

[21] Appl. No.: 66,230

[52] U.S. Cl. ........................................................... 16/46
[51] Int. Cl. ........................................................... A47b 91/00
[58] Field of Search ............... 16/18, 46, 45, 47, 48, 107, 16/98; 301/110, 114

[56] References Cited

UNITED STATES PATENTS

| 3,235,901 | 2/1966 | Rice et al. | 16/18 |
| 3,040,370 | 6/1962 | Ford | 16/47 |

FOREIGN PATENTS OR APPLICATIONS

| 1,920,995 | 11/1969 | Germany | 16/47 |
| 861,883 | 3/1961 | Great Britain | 16/47 |

*Primary Examiner*—Bobby R. Gay
*Assistant Examiner*—Doris L. Troutman
*Attorney*—Augustus G. Douvas, William J. Newman and Norton Lesser

[57] ABSTRACT

The following specification describes a two-wheel caster in which the junctions between parts are camouflaged for improved appearance. Both wheels have a blind hole and are press fit on bushings. The bushings are rotatably secured on the respective end of a common shaft located between the two wheels by means of a respective C-ring engaged in a shaft groove. The shaft is cantilever supported in a radial wall between the wheels with the wall having a peripheral arcuate hood wall formed integral therewith and overlapping a large portion of the wheel periphery. The pintle stem is rotatably secured by means of a C-ring engaged in a stem groove in a boss having a blind hole or recess extending into the radial wall.

1 Claims, 4 Drawing Figures

PATENTED MAR 14 1972  3,648,325

INVENTORS
ROBERT S. CARTWRIGHT
CHARLES N. STEWART

By *Norton Lesser*
Attorney

DOUBLE WHEELED CASTER

Field of the Invention

This invention relates in general to casters and more particularly to a two-wheel caster of improved appearance and more economical construction.

SUMMARY OF THE INVENTION

Casters are generally constructed with a horn or yoke comprising two depending legs between which a caster wheel is rotatably suspended on a pin extending through the legs. A pintle is secured to the back leg of the horn for rotation about an axis offset from the wheel axis and both the pintle securing structure and the wheel pin ends are exposed to view. This structure, while adequate and serviceable, presents an appearance problem. This problem is difficult to remedy with a two-wheel caster without a relatively expensive arrangement for holding the wheels and pintle in a camouflaged position.

The present invention utilizes a two-wheel caster in which each caster wheel has a blind hole or recess for press fitting on a respective bushing rotatably retained on a respective shaft and by a C-ring engaged in a respective shaft groove. The shaft is cantilever supported by a central radial wall and both are hidden by the two wheels and an arcuate hood wall integrally formed on the central wall. The hood wall extends partially around the wheels and overlaps the wheel periphery to camouflage the radial wall. The pintle stem is received in a blind hole or recess formed in a short boss projecting from the hood wall with the hole extending into the radial wall. A C-ring engaged in a groove in the pintle stem serves to hold the pintle rotatably in position. The end of the pintle stem engages a bottom wall of the hole to absorb axial thrust forces on the pintle.

It is therefore an object of the present invention to provide a two-wheel caster of improved appearance and economy.

Other objects and features of the present invention will become apparent on examination of the following specification and claims together with the drawings.

DESCRIPTION OF THE PREFERRED EMBODIMENT

Figure 1:
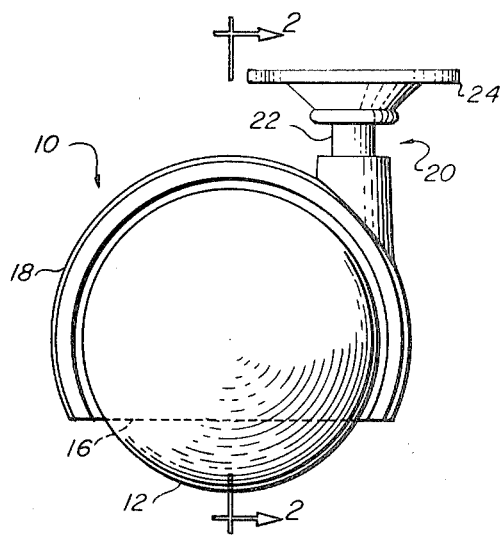
FIG. 1 is a side elevational view of a caster embodying the principles of the present invention.
Figure 2:
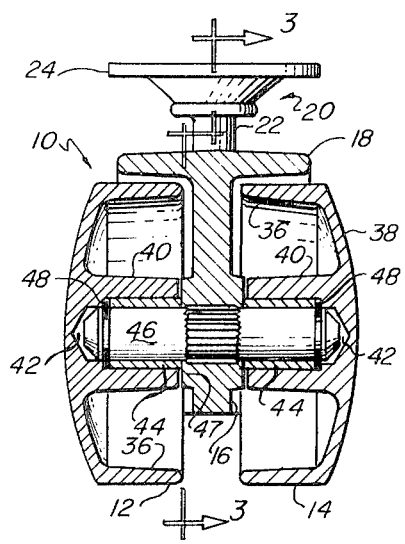
FIG. 2 is a sectional view taken along the line 2—2 in FIG. 1.
Figure 3:
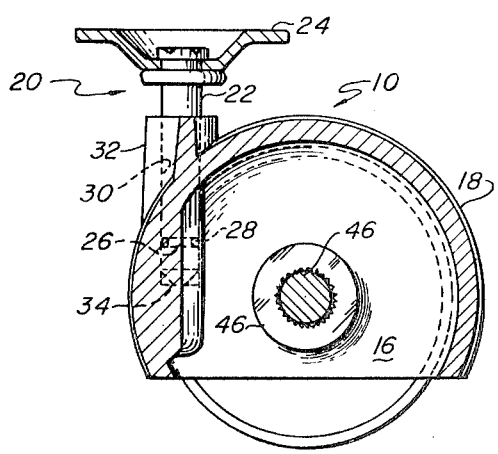
FIG. 3 is a sectional view taken along the line 3—3 in FIG. 2.
Figure 4:
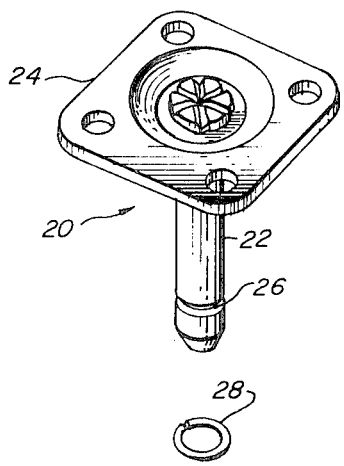
FIG. 4 is an isometric exploded view of the pintle and C-ring.

In FIG. 1 a caster is indicated by the reference character 10. The caster 10 comprises a pair of wheels 12 and 14 spaced on opposite sides of a central radial wall 16. An arcuate hood wall 18 is formed along the periphery of wall 16 and axially overlaps the periphery of each caster wheel 12 and 14 along the upper portion thereof for a distance exceeding 180°.

The caster 10 is attached to a furniture leg or other apparatus (not shown) by means of a pintle 20. The pintle comprises a stem 22 staked to a plate 24 which in turn is fastened to a furniture leg. It will be appreciated that the stem 22 may be secured in a furniture leg by other means such as a socket and the plate omitted.

The stem 22 has a groove 26 intermediate the stem ends and in which an expandible C-ring 28 is fitted. The stem end opposite plate 24 is tapered to facilitate expansion of the C-ring for engagement in groove 26. The stem is seated in a blind hole or recess 30 formed in a short annular boss 32. Boss 32 is integrally formed on the hood wall 18 with the recess 30 extending through the hood wall 18 and into an enlarged portion of the radial wall 16 to define an axis for the stem offset from the axis of wheels 12 and 14. The recess 32 terminates in an end wall 34 that serves to engage the stem end and receives the axial thrust of the stem at a position generally coplanar with the axis of wheels 12 and 14. The periphery of the C-ring 28 engaging the wall of recess 30 serves to prevent the walls 16 and 18 from disengaging from the stem 22.

The caster wheels 12 and 14 are generally cup shaped so as to define a rim wall 36 for engaging the floor or ground plane and backwall 38 both of which present smooth exterior surfaces for the caster. An annular central hub 40 is provided on the backwall 38 of each wheel with each hub projecting toward the radial wall 16 and each hub 40 is provided with a central blind hole or recess 42. Each recess 42 is press fit over a respective bushing 44 after the bushings are assembled on opposite ends of a common shaft 46.

The shaft 46 is knurled adjacent its midportion and press fit in an opening formed in a hub portion 47 of the radial wall adjacent the lower edge of wall 16 so that both the wall and the hub are hidden by the wheels. The bushings 44 are rotatably supported on the shaft 46 adjacent opposite ends of the shaft and a respective expandible C-ring 48 fitted over the tapered shaft ends and seated in a groove adjacent each tapered end of the shaft limits axial movement of the respective bushing. A shoulder in each wheel recess 42 seats against the respective C-ring 48 when the wheels are press fit on the bushings.

Thus, the caster presents an appearance in which all exterior surfaces are smooth with both the wheel and pintle connections being hidden and both the hood wall 18 and wheels 12 and 14 serving to camouflage the radial wall 16 while permitting the economical assembly and fabrication of the wheels and pintle.

The foregoing is a description of an improved two-wheel caster whose inventive concepts are not limited by the foregoing and are believed to be set forth in the accompanying claims.

What is claimed is:

1. A caster comprising a pair of spaced wheels each having an imperforate radial wall, an annular axial hub wall on each radial wall defining an axial first diameter recess spaced from said imperforate wall and terminating in a second smaller diameter recess defining a radial shoulder between each said first and second recesses, a bushing press fit in each first recess, a common horizontal shaft rotatably supporting each bushing with said shaft having tapered opposite ends engaged in a respective second recess and a groove between each shaft end and the adjacent bushing end, a C-ring fitted in each groove and located in the respective first wheel recess in abutment with a respective radial shoulder for limiting axial movement of a respective bushing toward the adjacent shaft end, a radial wall between said wheels with said shaft press fit in said wall, an arcuate hood wall integrally formed on the periphery of said radial wall and overlapping a portion of the periphery of said wheels for a distance exceeding 90°, a boss integrally formed on the periphery of said hood wall at a position offset from the axis of said shaft with said boss having a recess extending through said hood wall and into said radial wall along an axis perpendicular to and offset from the axis of said shaft, a rear wall for said boss recess, a pintle stem received in said boss recess with said pintle stem having a tapered end and a groove adjacent said end, and a C-ring received over said tapered end and seated in said pintle stem groove for engagement with the peripheral wall of said boss recess to hold said stem in said boss recess with said tapered end bearing against said rear wall of said boss recess.

* * * * *